(12) United States Patent
Baba (10) Patent No.: US 9,706,875 B2
(45) Date of Patent: Jul. 18, 2017

(54) BEVERAGE PERCOLATION DEVICE (71) Applicant: UCC Ueshima Coffee Co., Ltd., Chuo-ku, Kobe-shi, Hyogo (JP)

(72) Inventor: Michihiro Baba, Tokyo (JP)

(73) Assignee: UCC Ueshima Coffee Co., Ltd., Kobe, Hyogo (JP)

(*) Notice: Subject to any disclaimer, the term of this patent is extended or adjusted under 35 U.S.C. 154(b) by 142 days.

(21) Appl. No.: 14/436,415

(22) PCT Filed: Oct. 17, 2012

(86) PCT No.: PCT/JP2012/076830
§ 371 (c)(1),
(2) Date: Apr. 16, 2015

(87) PCT Pub. No.: WO2014/061121
PCT Pub. Date: Apr. 24, 2014

(65) Prior Publication Data
US 2015/0265092 A1    Sep. 24, 2015

(51) Int. Cl.
*A47J 31/44* (2006.01)
*A47J 31/10* (2006.01)

(52) U.S. Cl.
CPC ............. *A47J 31/44* (2013.01); *A47J 31/106* (2013.01)

(58) Field of Classification Search
CPC combination set(s) only.
See application file for complete search history.

(56) References Cited

U.S. PATENT DOCUMENTS 4,922,809 A * 5/1990 Fuhner ................. A47J 31/106
99/283
5,498,757 A * 3/1996 Johnson ............... A23C 9/1524
261/152

(Continued)

FOREIGN PATENT DOCUMENTS

AU    2008202438 A1    1/2009
CN    201055291 Y     5/2008

(Continued)

OTHER PUBLICATIONS

English Translation of JP H03198821 (Aug. 30, 1991).*
International Search Report (ISA/JP) for International Application No. PCT/JP2012/076830, mailed Nov. 27, 2012, 3 pages.

(Continued)

*Primary Examiner* — Quang D Thanh
*Assistant Examiner* — Renee Larose
(74) *Attorney, Agent, or Firm* — Foley & Lardner LLP; Antoinette F. Konski (57) ABSTRACT

Provided is a beverage percolation device that can efficiently supply hot water and water vapor and that does not require a user to perform troublesome work. An exemplary device provides a warm water storage tank (1) that holds water; an electric heater (10) that heats the water in the warm water storage tank (1); a hot water guide tube (4) that heats the water in the warm water storage tank (1) to a first temperature and guides that hot water to a coffee powder (C); a steam guide tube (3) that heats the water in the warm water storage tank (1) to a second temperature higher than the first temperature and guides that steam to the coffee powder (C); and a control unit (20) that controls the supply of the hot water and the steam to the coffee powder (C).

7 Claims, 8 Drawing Sheets

(56) References Cited

U.S. PATENT DOCUMENTS

| | | | | |
|---|---|---|---|---|
| 6,098,525 | A * | 8/2000 | Gijzel | A47J 31/36 99/280 |
| 7,322,275 | B2 * | 1/2008 | Lussi | A47J 31/54 99/281 |
| 8,661,967 | B2 * | 3/2014 | Gonen | A47J 31/36 99/281 |
| 2009/0007792 | A1 * | 1/2009 | Glucksman | A47J 31/057 99/282 |
| 2009/0084271 | A1 * | 4/2009 | Njaastad | A47J 31/54 99/323.3 |
| 2010/0005971 | A1 * | 1/2010 | Faccinti | A47J 31/36 99/281 |
| 2011/0252976 | A1 * | 10/2011 | Liu | A47J 31/002 99/288 |
| 2011/0305807 | A1 * | 12/2011 | Koeling | A47J 31/407 426/431 |

FOREIGN PATENT DOCUMENTS

| | | |
|---|---|---|
| CN | 101317740 A | 12/2008 |
| CN | 201996322 U | 10/2011 |
| JP | 64-008330 | 1/1989 |
| JP | 3-198821 A | 8/1991 |
| JP | 11-120434 A | 4/1999 |
| JP | 2003-24703 A | 1/2003 |
| JP | 2005-114189 A | 4/2005 |
| JP | 3773249 B2 | 5/2006 |
| JP | 2006/288502 A | 10/2006 |

OTHER PUBLICATIONS

Chinese Office Action and English translation issued in application No. 201280076448 dated Aug. 24, 2016.
Second Office Action in Chinese Application No. 2012800764480, mailed May 2, 2017.

* cited by examiner

| Setting no. | Operation | (1) Steam (intermittent type) | (2) No steam (intermittent type) | (3) No steam (single-injection type) |
|---|---|---|---|---|
| 1 | Steam | 20 | 0 | 0 |
| 2 | Standby | 0 | 0 | 0 |
| 3 | First percolation | 9 | 9 | 9 |
| 4 | Steam | 5 | 0 | 0 |
| 5 | Standby | 0 | 25 | 25 |
| 6 | Second percolation | 60 | 60 | 95 |
| 7 | Steam | 5 | 0 | 0 |
| 8 | Standby | 0 | 5 | 0 |
| 9 | Third percolation | 25 | 25 | 10 |
| A | Steam | 3 | 0 | 0 |
| b | Standby | 0 | 3 | 0 |
| c | Fourth percolation | 20 | 20 | 0 |
| d | Steam | 0 | 0 | 0 |
| E | Standby | 0 | 0 | 0 |
| F | Water supply with reduced pressure | 5 | 5 | 5 |

BEVERAGE PERCOLATION DEVICE

CROSS-REFERENCE TO RELATED APPLICATION

This application is a national phase entry under 35 U.S.C. §371 of International Application No. PCT/JP2012/076830, filed Oct. 17, 2012, the content of which is incorporated herein by reference in its entirety.

TECHNICAL FIELD

The present invention relates to beverage percolation devices for favorite foods such as coffee.

BACKGROUND ART

As beverage percolation devices for dropping hot water onto powdered coffee as an example of favorite food for percolating the coffee, there have been known drip-type coffee percolators. With such devices, it is possible to percolate coffee, by introducing an appropriate amount of coffee powder in a filter paper and pouring hot water thereonto from thereabove.

In pouring the hot water, it is important to perform "steaming", and the first pouring should be completed to such an extent that the coffee powder is slightly wetted at first. When the coffee powder is being in contact with the hot water, the coffee powder expands and, thus, can come into contact with the hot water over increased surface areas therein. Thus, the hot water can pass therethrough wholly, rather than passing therethrough only along certain passages, thereby enabling percolation of coffee with a stabilized flavor.

As a coffee percolator adapted to perform steaming as described above using water vapor, there is one disclosed in the following patent document. The coffee percolator includes a container having a pouring port and a water vapor port, a dropping portion for dropping coffee into the container, and a water-vapor supply mechanism. The water-vapor supply mechanism supplies water vapor to the inside of the container through the water vapor port in the container and, further, water vapor flows into the coffee powder within the dropping portion through the pouring port. This maintains the temperature for steaming the coffee powder at a higher temperature.

PRIOR ART DOCUMENTS

Patent Documents

Patent Document 1: Japanese Patent No. 3773249

SUMMARY OF THE INVENTION

Problems to be Solved by the Invention

However, with the aforementioned coffee percolator, the supply of hot water and the supply of water vapor are performed through completely-separated systems, which has necessitated the independent water-vapor supply mechanism. Further, there has been a need for operations for mounting the water-vapor supply mechanism to the container, which has forced users to perform burdensome operations.

The present invention was made in view of the aforementioned circumstances, and it is an object of the present invention to provide a beverage percolation device capable of efficiently performing supply of hot water and supply of water vapor and, further, eliminating the necessity of burdensome operations by users.

Means for Solving the Problems

In order to overcome the aforementioned object, a beverage percolation device according to the present invention includes:

a water housing portion adapted to house water;

heating means adapted to heat the water within the water housing portion;

a hot-water guide path adapted to heat the water within the water housing portion to a first temperature and to direct hot water to a favorite food;

a steam guide path adapted to heat the water within the water housing portion to a second temperature higher than the first temperature and to direct steam to the favorite food; and a control portion adapted to control supply of hot water and supply of steam to the favorite food.

There will be described effects and advantages of the beverage percolation device having this structure. The beverage percolation device includes the water housing portion for housing water, and the hot-water guide path and the steam guide path for directing the water (steam or hot water) within the water housing portion to the favorite food. Both the steam and the hot water are supplied from the common water housing portion, which simplifies the structure. Further, it is possible to control the supply of hot water and the supply of steam with the control portion. When the water is heated to the first temperature, it is possible to supply hot water therefrom. When the water is heated to the second temperature, it is possible to supply steam therefrom. It is also possible to control the changeover from the supply of steam to the supply of hot water. This enables efficiently performing the supply of hot water and the supply of water vapor and thus, enabling to eliminate the necessity of burdensome operations by users.

In the present invention, preferably, the hot-water guide path and the steam guide path include a common nozzle at their tip ends, and there are provided a path opening/closing mechanism adapted to open and close a path for directing hot water to the nozzle from the hot-water guide path, and the control portion adapted to control the path opening/closing mechanism.

By utilizing the common nozzle, it is possible to reduce the number of members, thereby enabling effective utilization of the space for placing the members. Further, by providing the path opening/closing mechanism, it is possible to control the supply of hot water and the supply of steam, thereby avoiding complicacy of user's manipulations.

In the present invention, preferably, the nozzle is placed in a bottom portion of the water housing portion. By placing the nozzle in the bottom portion, the temperature of the heated water within the water housing portion is transmitted thereto, which can maintain the hot water and the steam supplied through the nozzle at an appropriate temperature.

In the present invention, preferably, the beverage percolation device includes a liquid-surface sensor adapted to detect a liquid surface within the water housing portion, and the control portion adapted to control a level of the liquid surface so as to be a predetermined level, wherein the hot-water guide path has an introducing inlet which is set to be lower than the predetermined level, and the steam guide path has an introducing inlet which is set to be higher than the predetermined level.

By placing the liquid-surface sensor, it is possible to maintain the liquid surface within the water housing portion at the predetermined level. When the liquid surface has descended, it is possible to detect this and, further, it is possible to supply water to the inside of the water housing portion. Since the introducing inlet of the hot-water guide path is lower than the predetermined level, it is possible to continuously realize a state where the hot water can be supplied toward the nozzle. Further, since the steam guide path is higher than the predetermined level, it is possible to prevent the water that is liquid from entering the steam guide path. Only steam generated by vaporization at the liquid surface can be allowed to enter the steam guide path through its introducing inlet.

In the present invention, preferably, the hot-water guide path and the steam guide path are placed in a concentric manner. By placing them in a concentric manner, it is possible to effectively utilize the limited space.

In the present invention, preferably, the steam guide path is positioned in a center side, and the hot-water guide path is positioned in a peripheral side, and the path opening/closing mechanism includes a lower end portion of the steam guide path, a packing member which is in contact with this lower end portion, and driving means adapted to drive the steam guide path upwardly and downwardly.

With this structure, when the lower end portion of the steam guide path is in contact with the packing member, the hot water is not supplied to the nozzle, thereby realizing a state where only steam can be supplied to the favorite food. By upwardly moving the steam guide path, the path opening/closing mechanism is brought into an opened state, which enables directing the hot water to the nozzle.

In the present invention, preferably, the steam guide path is placed at a center portion of the favorite food to be supplied with hot water, and there is further provided a second steam guide path adapted to direct steam to a peripheral portion of the favorite food.

By providing the second steam guide path, it is possible to supply steam to the entire area of the favorite food, which enables performing steaming appropriately. Further, it is possible to maintain the temperature for percolating the favorite food at a predetermined higher temperature, over the entire area of the favorite food.

In the present invention, preferably, the beverage percolation device includes a water supply tube which is adapted to supply water to an inside of the water housing portion and has a water supply outlet which is set to be at a higher position than the predetermined level, and a water-supply guide path adapted to guide water supplied from the water-supply tube to the inside of the water housing portion, wherein the water-supply guide path has an outlet which is placed on the bottom portion side of the water housing portion.

With this structure, when the liquid surface has descended to below the predetermined level, water is supplied thereto through the water supply tube. The water is introduced thereto from the bottom portion side of the water housing portion, through the water-supply guide path. This can prevent hot water at lower temperatures from being supplied through the nozzle.

MODE FOR CARRYING OUT THE INVENTION

As a preferable embodiment of a beverage percolation device according to the present invention, a drip-type coffee percolator will be described. The description will be given by exemplifying a coffee powder for dripping, as an example of favorite food.

(The Entire Structure of a Drip-Type Percolator)

Figure 1:
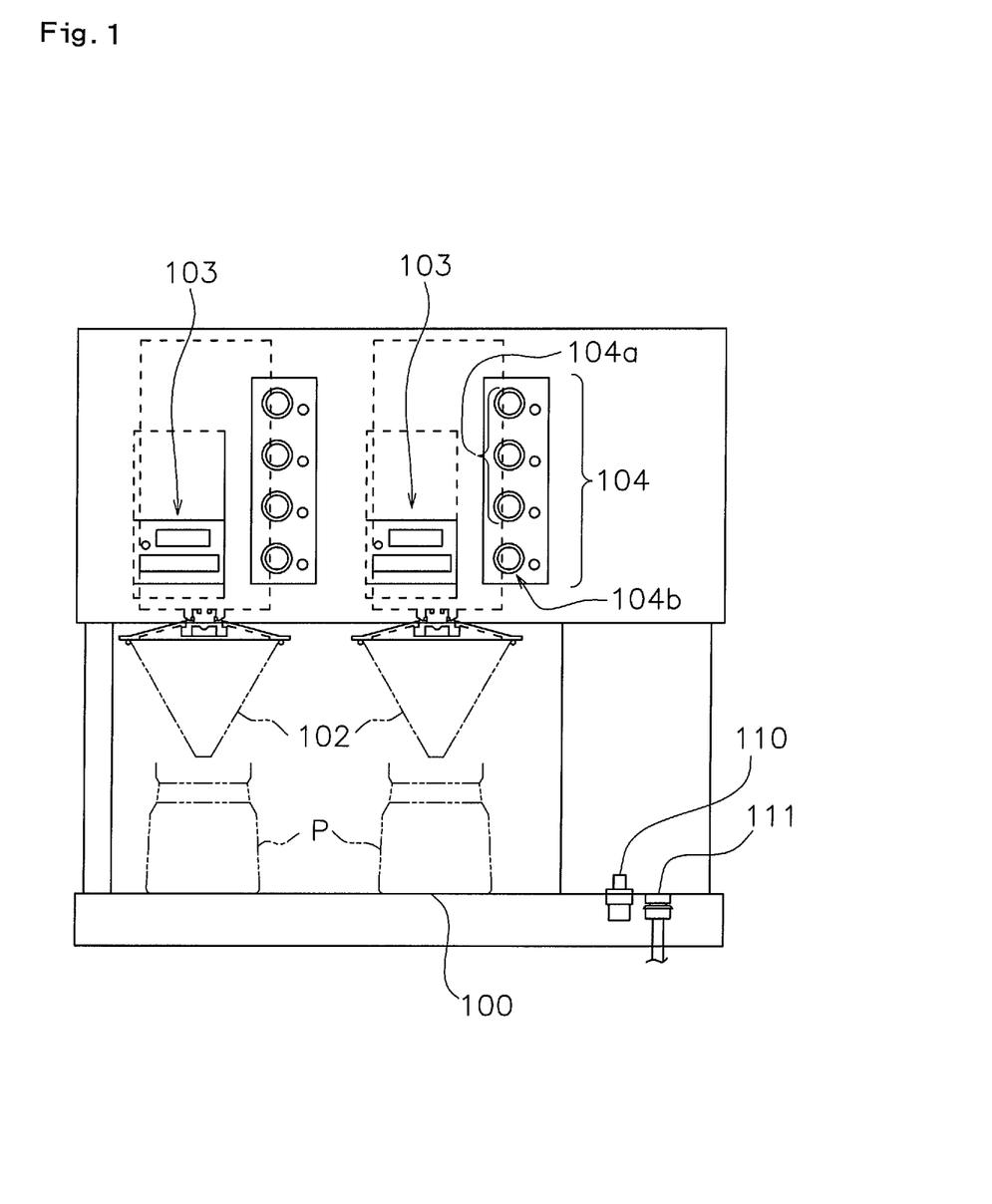
FIG. 1 is a front view illustrating the external appearance of a drip-type percolator.
Figure 2:
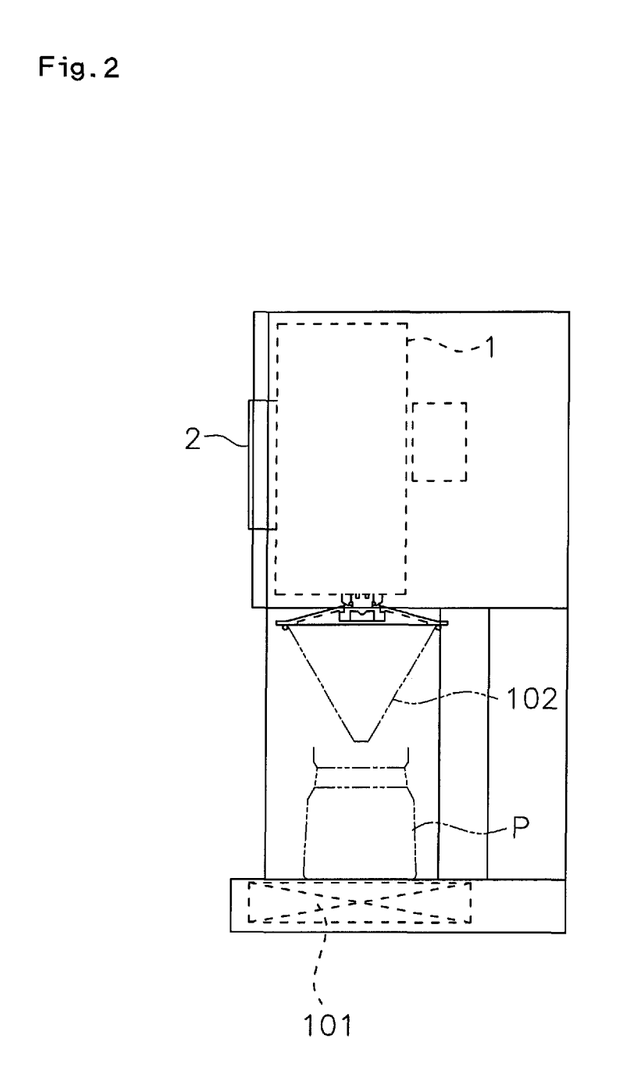
FIG. 2 is a side view illustrating the external appearance of the drip-type percolator.

FIG. 1 is a front view illustrating the external appearance of a drip-type percolator, and FIG. 2 is a side view illustrating the external appearance of the drip-type percolator. A placement portion 100 is adapted to enable placing two pots P (containers) thereon. The percolated coffee is housed in the pots P. The number of pots P which can be placed thereon is not limited to two and, can be also one or three or more. The placement portion 100 is provided with a warmer plate 101, which maintains the percolated coffee at an appropriate temperature. In the side facing the placement portion 100, there are provided drippers 102 (filter setting portions), on which filter papers can be set.

At upper portions of the drip-type percolator, there are placed power-supply manipulation portions 103, wherein there are placed power-supply switches and the like. Adjacent to the manipulation portions 103, there are placed mode-setting manipulation portions 104. The mode-setting manipulation portions 104 are provided with four manipulation switches, wherein there are placed three percolation amount setting portions 104a, and a steam setting portion 104b. The percolation amount setting portions 104a enable selecting any one of three stepped levels, which are S, M and L. If the steam setting portion 104b is selected, this enables automatically performing "steaming" using steam. If the steam setting portion 104b is not selected, "steaming" is not performed. It is possible to perform coffee percolation preferred by a user, through the combination of the percolation amount setting portions 104a, and the steam setting portion 104b.

Inside the upper portion of the drip-type percolator, there are provided hot-water storage tanks 1 (which correspond to a water housing portion). Since the percolation of coffee can be performed at the two positions, there are also provided the two hot-water storage tanks 1, but only a single hot-water storage tank 1 with a larger capacity can be provided to be shared therebetween. A window 2 is provided, in order to enable visually recognizing the insides of the hot-water storage tanks 1.

In a deeper side of the bottom portion side of the drip-type percolator, there are provided a water-supply connecting joint 110, and a power-supply code 111. The water-supply connecting joint 110 is connected to a water faucet and the like through a hose and the like, so as to enable supplying water to the insides of the hot-water storage tanks 1.

(Details of the Percolation Mechanism)

Figure 4:
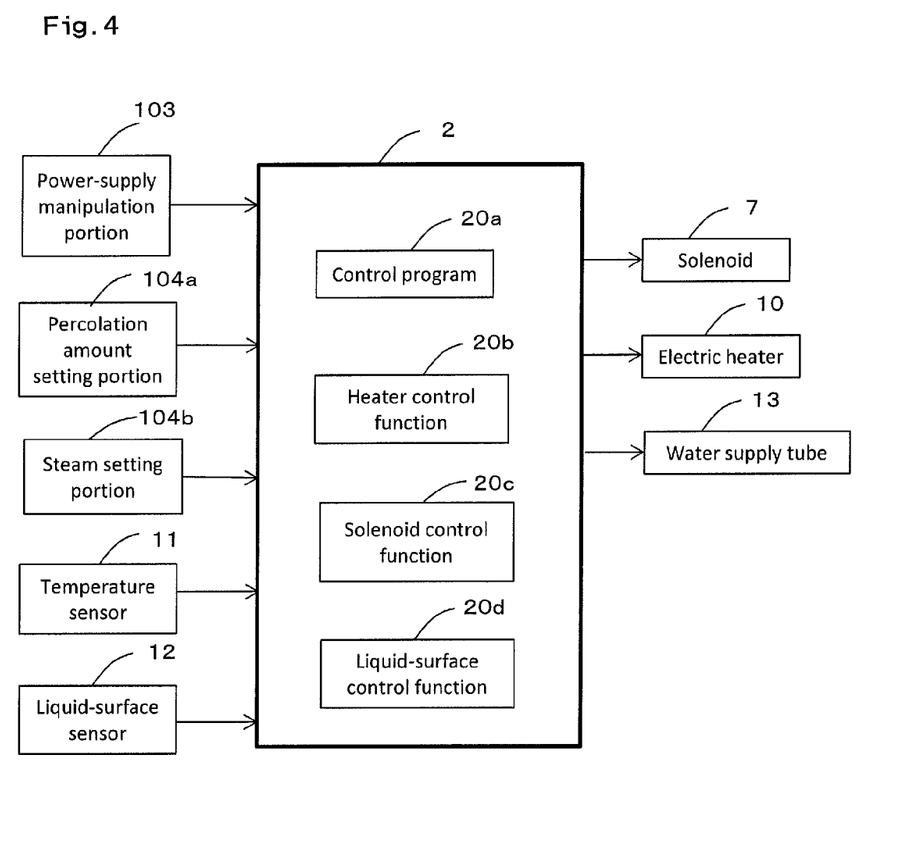
FIG. 4 is a block diagram illustrating a control mechanism in the drip-type percolator.
Figure 5:
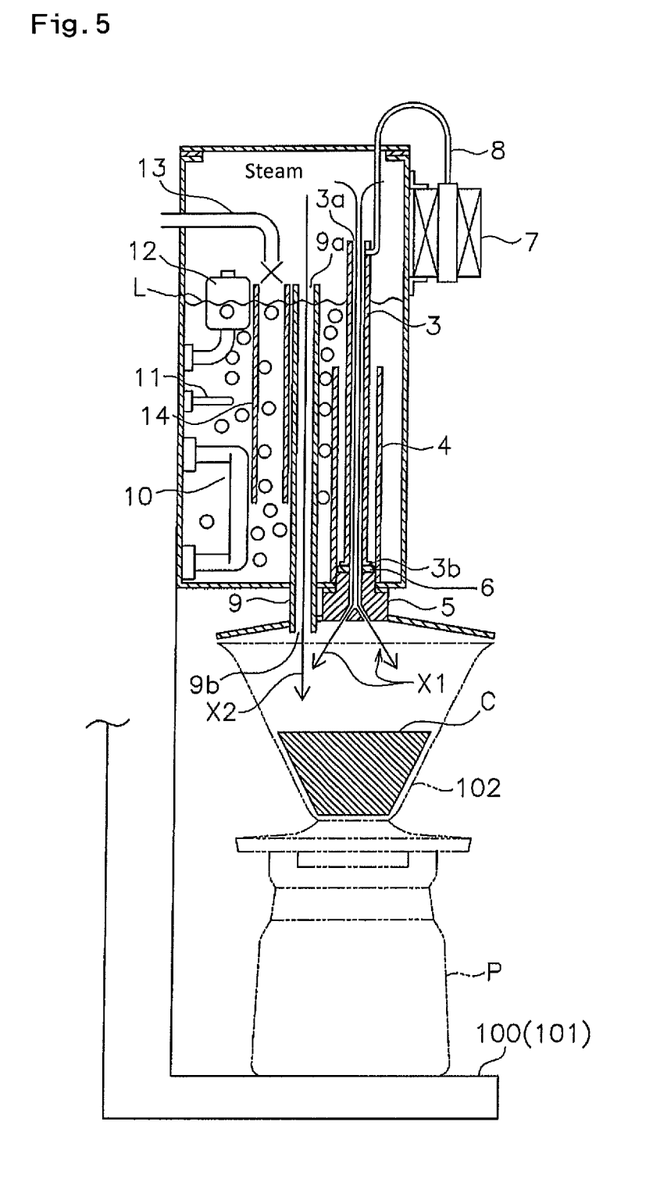
FIG. 5 is a view illustrating an operation of the percolation mechanism in the drip-type percolator (when steam is supplied).
Figure 6:
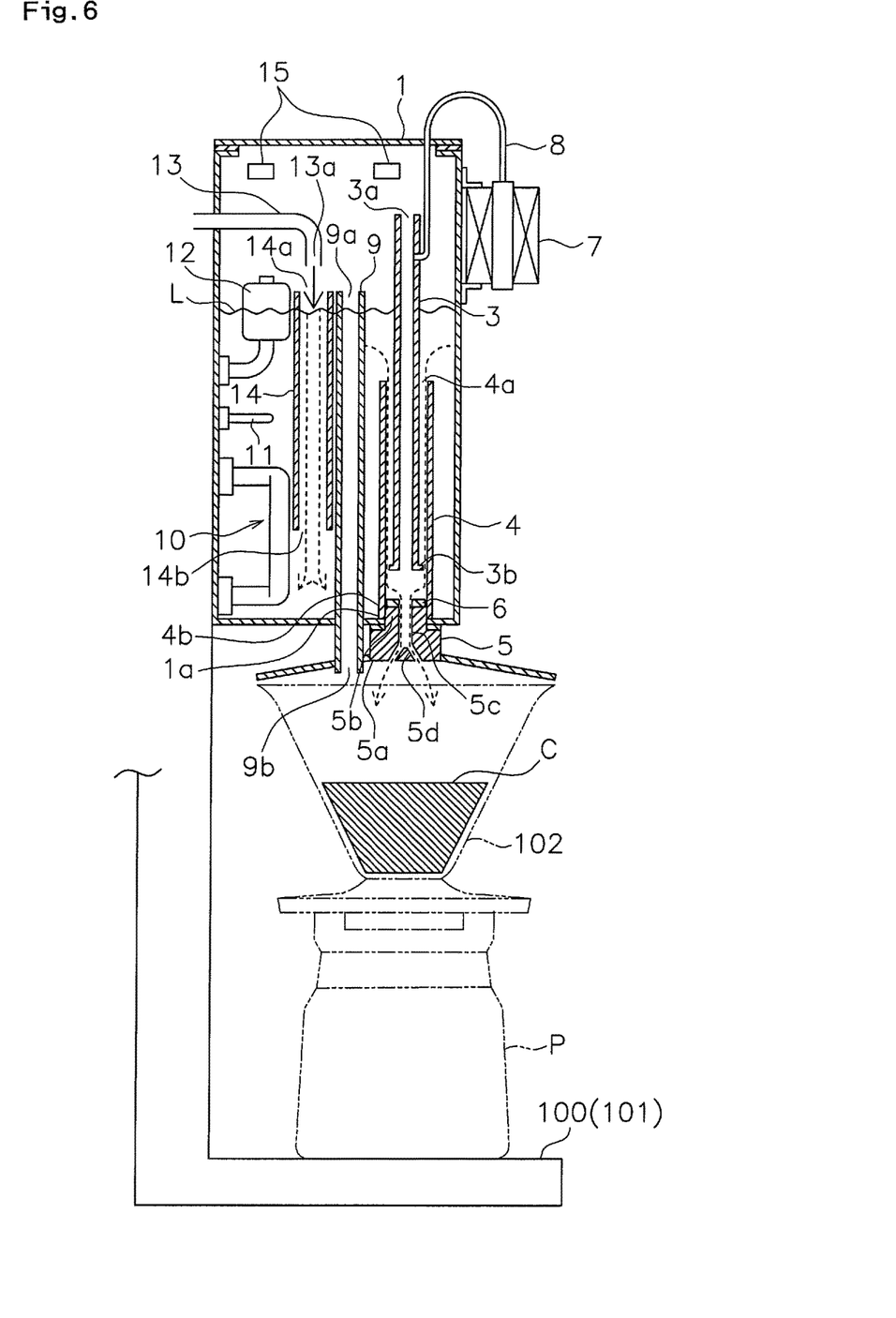
FIG. 6 is a view illustrating an operation of the percolation mechanism in the drip-type percolator (when hot water is supplied).

Next, there will be described, in detail, the percolation mechanism in the drip-type percolator illustrated in FIGS. 1 and 2, with reference to a conceptual view in FIG. 3. FIG. 4 is a block diagram illustrating a control mechanism. FIG. 5 illustrates a view of a state where steam is being supplied (a state before a percolation operation is started), and FIG. 6 is a conceptual view illustrating a state where hot water is being supplied.

On the upper portion of a pot P, there is provided a dripper 102, which interiorly houses a coffee powder. On the upper portion of the dripper 102, a hot-water storage tank 1 is placed. The dripper 102 is detachably mounted thereto, and a filter paper is placed therein.

A steam guide tube 3 (which corresponds to a steam guide path) is provided on a center axis of the dripper 102, and a hot-water guide tube 4 (which corresponds to a hot-water guide path) is provided on the same center axis. Accordingly, the steam guide tube 3 and the hot-water guide tube 4 are placed in a concentric manner, wherein the steam guide tube 3 is positioned in a central outer-layer side, and the hot-water guide tube 4 is positioned in a peripheral side. At the outlets of the steam guide tube 3 and the hot-water guide tube 4, a common nozzle 5 is provided. With this placement and structure, it is possible to simplify the structure, and effectively utilize the limited placement space. The nozzle 5 is placed in the bottom surface of the hot-water storage tank 1. Therefore, when the water within the hot-water storage tank 1 has been heated, the temperature thereof is immediately transmitted to the nozzle 5, which enables maintaining the nozzle 5 at a higher temperature.

The steam guide tube 3 has an introducing inlet 3a at its upper end portion, which is set to be continuously above the liquid surface L. This enables introducing only steam into the steam guide tube 3, while preventing water from entering thereinto. The steam guide tube 3 has a lower end portion 3b which is in contact with a packing member 6. The packing member 6 is mounted to an upper portion of the nozzle 5.

The nozzle 5 is constituted by a larger-diameter portion 5a and a smaller-diameter portion 5b and is secured to the bottom portion of the hot-water storage tank 1 by fitting the smaller-diameter portion 5a in a fitting hole 1a provided in the bottom portion of the hot-water storage tank 1. The nozzle 5 is provided with a flow path 5c formed along its center axis, and the flow path 5c forms a branch flow path 5d at its tip end. This branch flow path 5d is adapted to supply hot water and steam to the coffer powder C over a widest possible range therein. The number of branches in the branch flow path 5d can be determined as appropriate.

The hot-water guide tube 4 has an introducing inlet 4a at its upper end portion, which is set to be continuously below the liquid surface L. Thus, the hot water having been heated within the hot-water storage tank 1 is directly directed to the hot-water guide tube 4. The hot-water guide tube 4 has a lower end portion 4b which is fitted to the smaller-diameter portion 5b of the nozzle 5 to be secured thereto. With this structure, it is possible to pour hot water at a desired temperature onto the coffee powder C, without inducing thermal losses.

The steam guide tube 3 is adapted to be driven upwardly and downwardly, through a solenoid 7 and a coupling wire 8. The solenoid 7 and the coupling wire 8 function as driving means. The driving means for driving the steam guide tube 3 is not limited to the aforementioned structure, and driving means which uses a motor or a cylinder as a driving source, for example, can be adopted.

Figure 3:
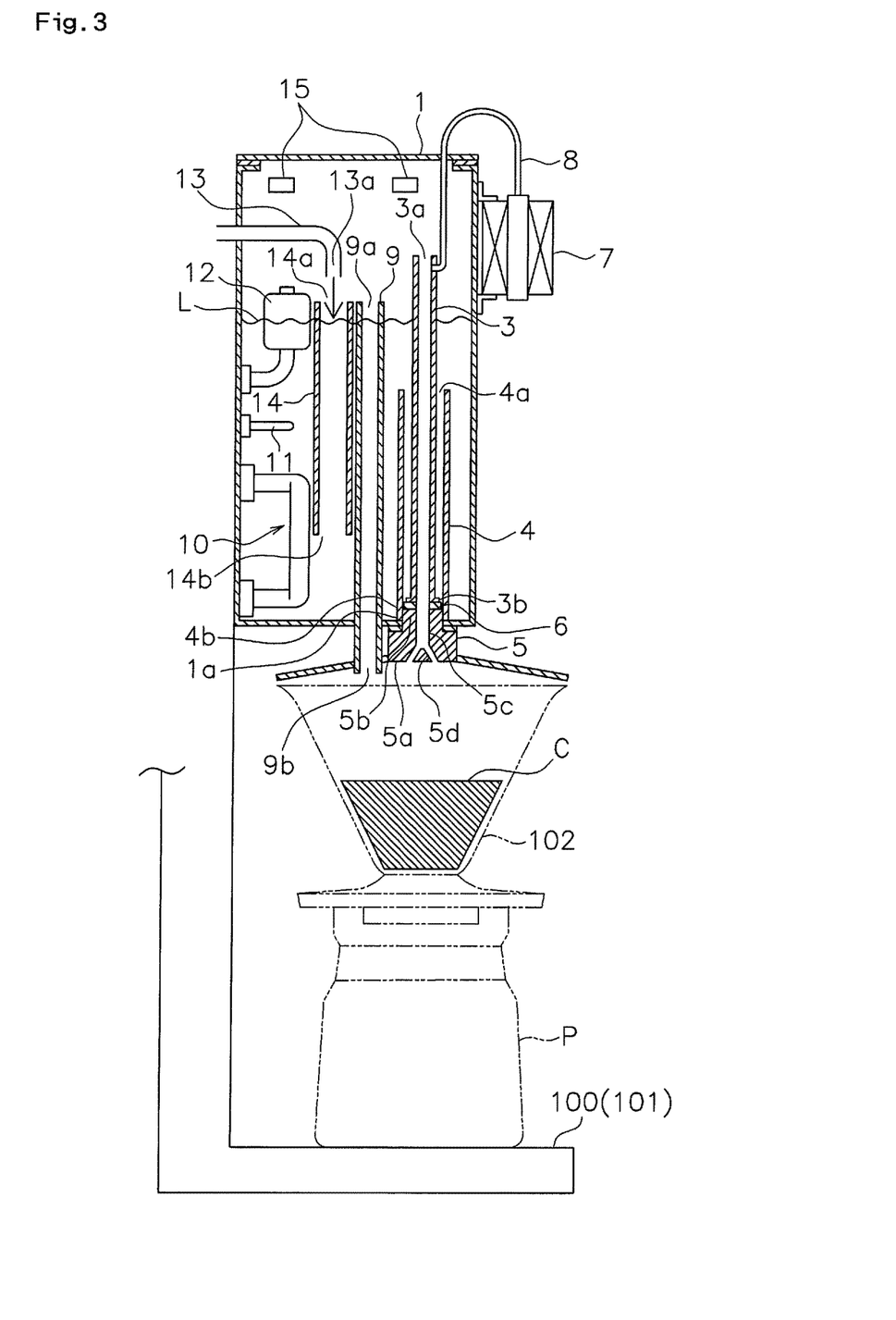
FIG. 3 is a view illustrating details of a percolation mechanism in the drip-type percolator (during standby).

FIG. 3 is a state where the lower end portion 3b of the steam guide tube 3 is in contact with the packing member 6, which is a state where only steam is directed to the nozzle. If the solenoid 7 is driven, the steam guide tube 3 is pulled upwardly by the coupling wire 8 (see FIG. 6). This forms a gap (a flow path) between the lower end portion 3b and the packing member 6, thereby realizing a state where hot water is directed to the nozzle 5 through the hot-water guide tube 4. Namely, the packing member 6, the lower end portion 3b of the steam guide tube 3, and the aforementioned driving means function as a path opening/closing mechanism.

Adjacent to the steam guide tube 3, there is placed an over-flow tube 9 (which corresponds to a second steam guide path). The over-flow tube 9 has an upper end portion 9a which functions as an introducing inlet for introducing steam therein. The over-flow tube 9 has a lower end portion 9b which is communicated with the inside of the dripper 102 which houses the coffee powder C. Through the over-flow tube 9, steam can be also supplied to the coffee powder C. The steam (hot water) from the steam guide tube 3 is supplied to the center portion of the dripper 102, while the steam from the over-flow tube 9 is supplied to a peripheral portion thereof. This enables supplying steam to the entire coffee powder C. Also, it is possible to provide two or more over-flow tubes 9, instead of only a single over-flow tube 9.

The height of the upper end portion 9a of the over-flow tube 9 is set such that the upper end portion 9a is continuously at a position higher than the liquid surface L. However, the upper end portion 9a is set to be at a position lower than the introducing inlet 3a of the steam guide tube 3. Further, by providing the over-flow tube 9, the air is communicated with the inside of the hot-water storage tank 1, which prevents reduction of the pressure in the inside thereof, thereby enabling properly controlling the amount of hot water supplied therefrom.

An electric heater 10 (which corresponds to heating means) is provided on the bottom portion side of the hot-water storage tank 1. The configuration of the heater is not limited to a particular configuration. A temperature sensor 11 detects the temperature of the water within the hot-water storage tank 1. A liquid-surface sensor 12 detects the level of the liquid surface within the hot-water storage tank 1. The liquid-surface sensor 12 is provided in order to maintain the liquid surface L within the hot-water storage tank 1 at a predetermined level. The liquid-surface sensor 12 employed therein is of a magnet type, but the liquid-surface sensor 12 can be also constituted by a sensor of a different type.

A water supply tube 13 supplies water to the inside of the hot-water storage tank 1. The water supply tube 13 has a water supply outlet 13a which is set to be above the liquid surface L. Beneath the water supply outlet 13a, there is provided a water-supply guide tube 14 (which corresponds to a water-supply guide path). The water-supply guide tube 14 has an upper end portion 14a which is set to be at a position higher than the liquid surface L. The upper end portion 14a is set to be at the same height as that of the upper end portion 9a of the over-flow tube 9. The water-supply guide tube 14 has a lower end portion 14b (an outlet) that is positioned on the bottom portion side of the hot-water storage tank 1. The water at the room temperature from the water supply tube 13 is supplied from the bottom portion side of the water contained within the hot-water storage tank 1, rather than being supplied to the liquid surface L. Accordingly, this prevents water that has not been heated from being directly directed to the nozzle 5.

LEDs 15 are placed inside the hot-water storage tank 1. The LEDs 15 illuminate the inside thereof, which makes it easier to visually recognize the inside through the window 2. Further, as the light source, it is also possible to employ other light sources such as halogen lamps, instead of the LEDs 15.

(The Structure of the Control Mechanism)

FIG. 4 is a block diagram illustrating the control mechanism in the drip-type percolator. A control portion 20 stores a control program 20*a* and is adapted to control the respective portions, in such a way as to enable proper percolating operations, based on the contents of settings through the percolation amount setting portions 104*a* and the steam setting portion 104*b*.

The electric heater 10 is driven to heat the water, in order to make the water be hot water at a temperature of 95 to 98° C. (a first temperature), which is suitable for coffee percolation. In cases where a setting for generating steam is made through the steam setting portion 104*b*, the water is heated such that the water reaches its boiling temperature (for example, 100° C. or more: which corresponds to a second temperature). A heater control function 20*b* drives and controls the electric heater 10, while monitoring the temperature sensor 12, such that the water reaches the first temperature or the second temperature.

Further, in order to supply the hot water, it is necessary to move the steam guide tube 3 upwardly and, therefore, the solenoid 7 is driven. A solenoid control function 20*c* drives and controls the solenoid 7. The time period for which the hot water is supplied is determined by the time period for which the steam guide tube 3 is lifted up. This time period is determined according to the contents of the control program 20*a*. The time period for which the solenoid 7 is driven can be determined, according to which mode has been selected, out of S, M and L, through the percolation amount setting portions 104*a*.

A liquid-surface control function 20*d* controls the water supply tube 13, such that the liquid surface L in the hot-water storage tank 1 is maintained at a predetermined level. If the liquid-surface sensor 12 detects that the liquid surface L has descended to the predetermined level or lower, the liquid-surface control function 20*d* controls the water supply tube 13 in such a way as to introduce water into the hot-water storage tank 1. Further, the timing of introducing water thereinto can be determined as appropriate.

(Operations of the Drip-Type Percolator)

Next, there will be described operations for percolating coffee using the drip-type percolator according to the present embodiment, with reference to a flow chart in FIG. 7. The pot P is set on the placement portion 100 in the drip-type percolator and, also, a filter and a coffee powder C are set in the dripper 102.

At first, the power supply switch is turned on (S1). Next, a setting is made through the percolation amount setting portions 104*a*. The percolation amount is selected out of S, M and L (S2). Next, a setting as to whether or not steaming is performed is made through the steam setting portion 104*b* (S3). When steaming using steam is not performed, a percolation-starting button is pushed (S4) and, thereafter, percolation is performed according to a normal percolation program (S6).

When steaming using steam is performed, the percolation-starting button is pushed (S4) and, thereafter, percolation is performed according to a predetermined percolation program (S5). Further, as the percolation program in S5 or S6, it is preferable that any of two or more programs, instead of only a single type of program, can be selected according to user's preference.

Figure 8:
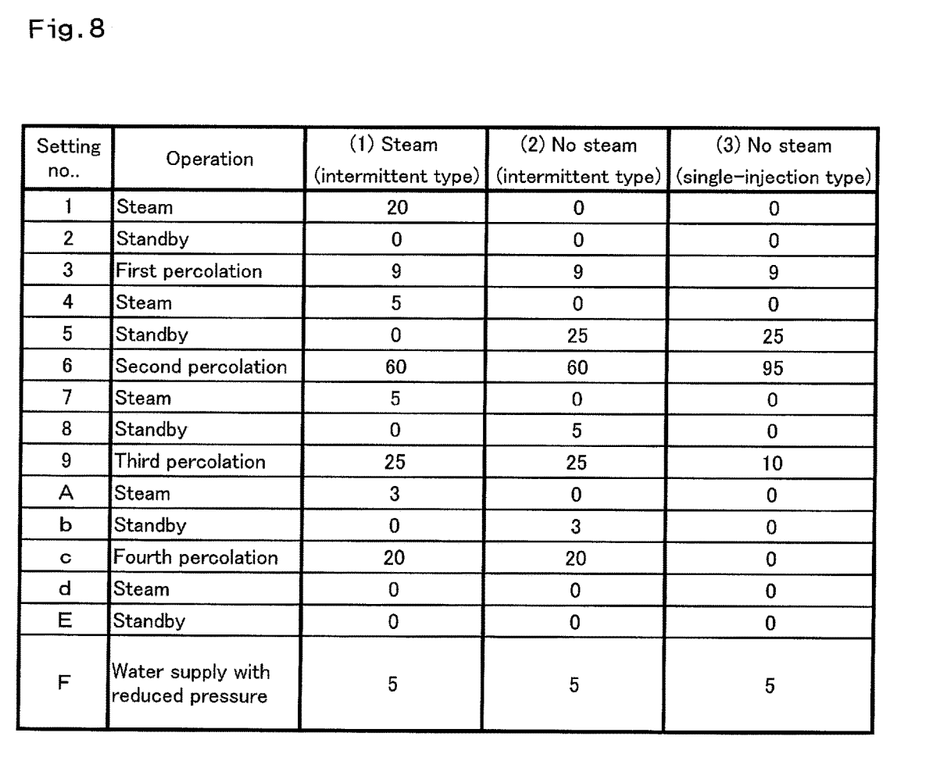
FIG. 8 is a view illustrating examples of percolation programs.

FIG. 8 is a view of operations illustrating examples of percolation programs. At first, there is illustrated, in a left side, a program in a case of supplying steam. In a step A1, steam is supplied for 20 seconds. FIG. 5 illustrates the state of the inside at this time. When steam is supplied, the steam guide tube 3 is in the same state as that during standby. The lower end portion 3*b* of the steam guide tube 3 is in contact with the packing member 6 and, therefore, the path opening/closing mechanism is in a closed state. Accordingly, the hot water is not supplied to the nozzle 5.

The water is heated to be brought into a boiled state, and steam generated from the liquid surface L enters the steam guide tube 3 through its introducing inlet 3*a* and is supplied to the coffee powder C through the branch flow path 5*d* of the nozzle 5. Further, steam is also supplied thereto through the over-flow tube 9. The directions of the supply of steam are indicated by allows X1 and X2. Thus, steam is thoroughly supplied to the entire coffee powder C.

Next, as an operation for a first percolation, the hot water is supplied from the nozzle 5 for 9 seconds. When the hot water is supplied therefrom, control is performed, such that the temperature to which the water is heated is the first temperature. Further, the solenoid 7 is driven to upwardly move the steam guide tube 3. This brings the path opening/closing mechanism into an opened state, thereby supplying the hot water to the coffee powder C through the nozzle 5. Hereinafter, the supply of steam and the supply of the hot water are alternately repeated. At last, since the amount of the water has been reduced, the hot-water storage tank 1 is replenished with water through the water supply tube 13, while the liquid surface is monitored by the liquid-surface sensor 12.

In the steam supply mode (an intermittent type) illustrated in FIG. 8, the combination of the supply of steam and the supply of hot water is repeated four times. The number of repeats thereof can be set as appropriate, while an example thereof is illustrated in FIG. 8. By supplying steam halfway through the percolation, it is possible to maintain the coffee powder C at a predetermined high temperature, which enables percolation of coffee with an excellent flavor. Further, the time period for which steam is supplied, and the time period for which the hot water is supplied can be changed as appropriate. Further, it is also possible to provide two or more steam supply modes, such that the user can select any of them.

Figure 7:
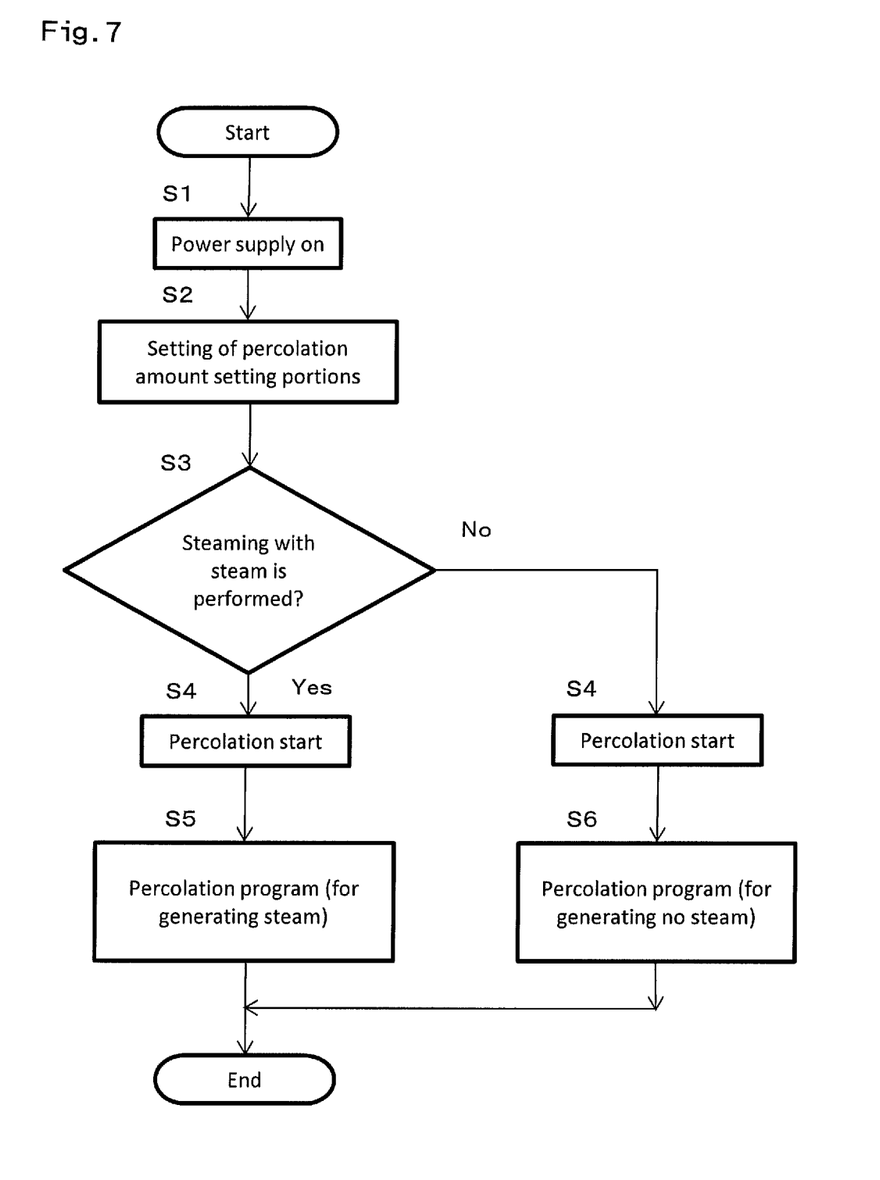
FIG. 7 is a flow chart of actions.

As modes for supplying no steam, FIG. 7 illustrates modes of two types, which are an intermittent type and a single-injection type. In these modes, there are set standby time periods between percolations. As a matter of course, standby time periods can be also set in the steam supply mode.

OTHER EMBODIMENTS

Although the over-flow tube 9 is provided in the present embodiment, it may not be provided. Further, in cases of providing the over-flow tube 9, two or more over-flow tubes can be provided, instead of only a single over-flow tube 9.

Although, in the present embodiment, there has been exemplified a device for percolating coffee, the present invention is not limited thereto and can be also applied to percolations of black teas and green teas.

Although, in the present embodiment, the steam guide tube 3 and the hot-water guide tube 4 are placed in a concentric manner, they can be also placed separately from each other. In this case, an opening/closing control valve is provided halfway through the hot-water guide tube 4 and is adapted to be controlled to be opened and closed. The hot-water storage tanks 1 as the water housing portion are not required to have a rectangular parallelepiped shape, and it is also possible to employ tanks with other shapes such as circular cylindrical shapes.

The concrete numerical values of the first temperature and the second temperature are not limited to the aforementioned numerical values.

DESCRIPTION OF REFERENCE SIGNS

C Coffee powder
L Liquid surface
P Pot
1 Hot-water storage tank
3 Steam guide tube
3*a* Introducing inlet
4 Hot-water guide tube
4*a* Introducing inlet
5 Nozzle
6 Packing member
7 Solenoid
8 Coupling wire
9 Over-flow tube
10 Electric heater
11 Temperature sensor
12 Liquid-surface sensor
13 Water supply tube
14 Water-supply guide tube
15 LED
20 Control portion

The invention claimed is:

1. A beverage percolation device comprising:
a water housing portion adapted to house water;
heating means adapted to heat the water within the water housing portion;
a hot-water guide path adapted to heat the water within the water housing portion to a first temperature and to direct hot water to a favorite food;
a steam guide path adapted to heat the water within the water housing portion to a second temperature higher than the first temperature and to direct steam to the favorite food; and
a control portion adapted to control supply of hot water and supply of steam to the favorite food; and
a liquid-surface sensor adapted to detect a liquid surface within the water housing portion, wherein the control portion is adapted to control a level of the liquid surface so as to be a predetermined level,
wherein the hot-water guide path has an introducing inlet which is set to be at a lower position than the predetermined level, and the steam guide path has an introducing inlet which is set to be at a higher position than the predetermined level.

2. The beverage percolation device according to claim 1, wherein
the hot-water guide path and the steam guide path include a common nozzle at their tip ends, and
there are provided a path opening/closing mechanism adapted to open and close a path for directing hot water to the nozzle from the hot-water guide path, and the control portion adapted to control the path opening/closing mechanism.

3. The beverage percolation device according to claim 2, wherein the nozzle is placed in a bottom portion of the water housing portion.

4. The beverage percolation device according to claim 1, wherein the hot-water guide path and the steam guide path are placed in a concentric manner.

5. The beverage percolation device according to claim 4, wherein
the steam guide path is positioned in a center side, and the hot-water guide path is positioned in a peripheral side, and
the path opening/closing mechanism comprises
a lower end portion of the steam guide path, a packing member which is in contact with this lower end portion, and driving means adapted to drive the steam guide path upwardly and downwardly.

6. The beverage percolation device according to claim 1, wherein
the steam guide path is placed at a center portion of the favorite food to be supplied with hot water, and
there is further provided a second steam guide path adapted to direct steam to a peripheral portion of the favorite food.

7. The beverage percolation device according to claim 1, comprising a water supply tube which is adapted to supply water to an inside of the water housing portion and has a water supply outlet which is set to be at a higher position than the predetermined level, and
a water-supply guide path adapted to guide water supplied from the water-supply tube to the inside of the water housing portion, wherein the water-supply guide path has an outlet which is placed on a bottom portion side of the water housing portion.

* * * * *